O. M. MERRICK.
Rotary-Churn.

No. 164,387. Patented June 15, 1875.

Figure 3:
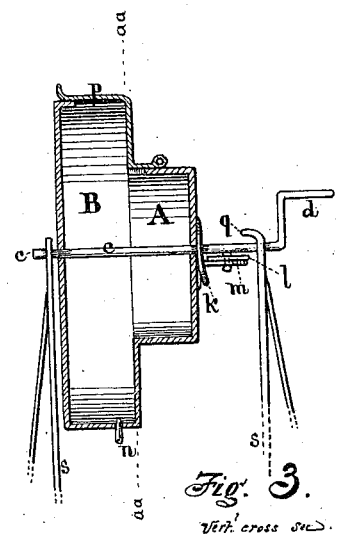

Vert. sec. on line a a a a fig. 3

Vert. cross sec.

Witnesses
Clarence Thurlow  John Ames

Oscar M. Merrick,
by E. Thurlow his atty
in fact

THE GRAPHIC CO. PHOTO-LITH. 39 & 41 PARK PLACE, N.Y.

UNITED STATES PATENT OFFICE.

OSCAR M. MERRICK, OF CHILLICOTHE, ILLINOIS.

IMPROVEMENT IN ROTARY CHURNS.

Specification forming part of Letters Patent No. 164,387, dated June 15, 1875; application filed February 3, 1875.

*To all whom it may concern:*

Be it known that I, OSCAR M. MERRICK, of Chillicothe, in the county of Peoria, and in the State of Illinois, have invented an Improvement in Churns; and I do hereby declare that the following is a full, clear, and exact description thereof, reference being had to the annexed drawings making a part of this specification, in which like letters of reference refer to like parts, and in which—

Figure 1:
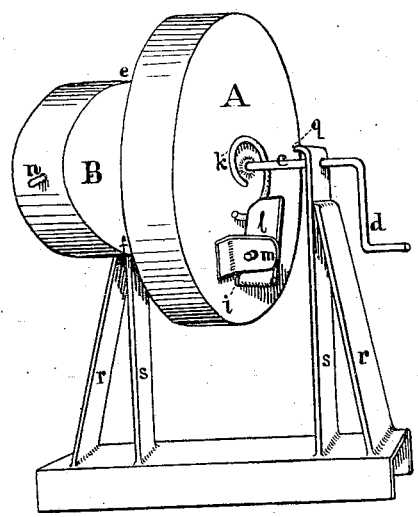
Figure 2:
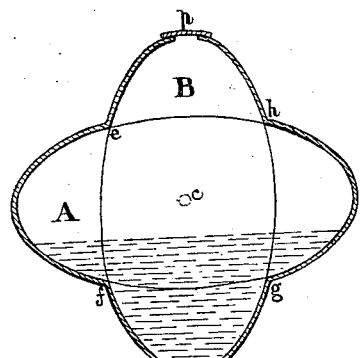

Figure 1 represents a perspective view; Fig. 2, a vertical section on line *a a a a*, Fig. 3; Fig. 3, a vertical cross-section through axis of churn.

The object of this invention is, first, to provide a churn for the making of butter, which shall be equally effective in producing the same, whether the churn be full or only partially supplied, being so constructed that the force of the concussion by which the globules are broken is not impaired by said increased amount of cream; second, to provide a non-corroding interior surface, upon which the cream can have no chemical action, at the same time to be a smooth, hard, plain surface, free from sharp corners, from which the butter can be quickly removed without trouble; third, to do away, for the furtherance of the latter object, with all interior works or dashers; fourth, to provide a churn which shall be strong and of imperishable material.

This churn is composed of two hollow elliptical iron boxes, A B, about eighteen by twenty-four inches, joined together, to form one vessel, in such a manner that their major axes cross their respective lesser axes at a right angle, the form thus produced becoming self-balancing, that portion of the material forming the sides or flank of the boxes, which would thus come in contact, being cut away, so as to allow the cream to pass from one box into the other in rotating. As before said, the material is cast-iron, heavily lined with carbonized enamel or porcelain, and possesses a large opening, *p*, closed by a valve, and a smaller one, *n*, for emission of cream, &c. A ventilating-hole, *i*, is placed on one side, facing the standard *s*, which is closed by a stopper, *l*, which is pivoted on a support, *m*, attached to the churn, and kept closed by a spring, *k*, beneath one arm of said stopper.

The stopper is so arranged as to be closed when the ventilating-hole passes below the surface of the cream, and opened to admit air when the same is above said surface, by the pressure of a projecting lip, *q*, of the standard *s* against the arm of the stopper. An axle, *c*, passes through the common center of the ellipses A B, (but I also use or cast short axles on each side of the vessel, to avoid obstructing the interior of the churn,) which rotate in journals on the standards *s s*, operated by a crank, *d*, in the usual mode.

This churn it will be seen, though irregularly shaped, is self-balancing.

The operation of this churn is as follows: The rotary course of the end of each ellipse A B, meeting the opposing momentum of the cream as it rushes down the side or least curved flank of each ellipse, thoroughly and equally agitates the entire mass of the same, especially as there are four such motions at each revolution of the churn, and the rolling motion of the cream upon itself serves to develop the butter-globules, while the four concussions to each revolution break them and liberate the butter. This effect is not impaired by an increased amount of cream deposited in the churn, as in all dasher-churns the dashers, when immersed, become mere stirring-sticks, having little effect as soon as the cream rises above them.

Besides the four concussions of the cream at each rotation of the churn, the cream runs violently from one ellipse into the other four times in each revolution, thus doubling the action of the churn, and accomplishing the object for which the two ellipses are combined.

It would seem at first thought that the force of the concussion would be diminished in this double ellipse, considering that an increase of cream leaves less room for it to acquire momentum with which to meet the small ends of the ellipses; but, as will be seen by the drawings, when the double ellipse is half full, the cream still has to run the full length of the major axis of each ellipse at every revolution, making four runs of the major axis to each revolution.

Some of the advantages of the churn are, first, that butter will not adhere to the porcelained surface, as there exists no mechanical or chemical cause; second, that the churn has no inconvenient corners, and is thus readily cleansed and easily kept sweet, as the surface cannot absorb cream, so as to become rancid; third, the durability of and non-corrosiveness of the material.

What I claim as my invention is—

A rotary churn formed of two equal-sized elliptic vessels, joined to form one reservoir, in such a manner that the corresponding axes shall be at right angles with each other, and with the usual cream-openings and ventilator, and usual axes of trunnions and crank, with which to rotate it, substantially as described.

In testimony that I claim the foregoing improvement in churns, I have hereunto set my hand this 14th day of January, 1875.

OSCAR M. MERRICK.

Witnesses:
G. H. KETTELLE,
JAS. M. MORSE.